T. KINGSFORD.
Apparatus for the Manufacture of Starch.

No. 140,141. Patented June 24, 1873.

Attest,
F. W. Howard
L. H. Trook

Inventor,
Thomson Kingsford
By his Attorney
Chas. F. Stansbury

UNITED STATES PATENT OFFICE.

THOMSON KINGSFORD, OF OSWEGO, NEW YORK.

IMPROVEMENT IN APPARATUS FOR THE MANUFACTURE OF STARCH.

Specification forming part of Letters Patent No. 140,141, dated June 24, 1873; application filed June 9, 1873.

*To all whom it may concern:*

Be it known that I, THOMSON KINGSFORD, of the city and county of Oswego, State of New York, have invented an Improvement in the Apparatus used in the Manufacture of Starch; and I do hereby declare the following to be a full and correct description of the same, reference being had to the accompanying drawings, in which—

Figure 1:
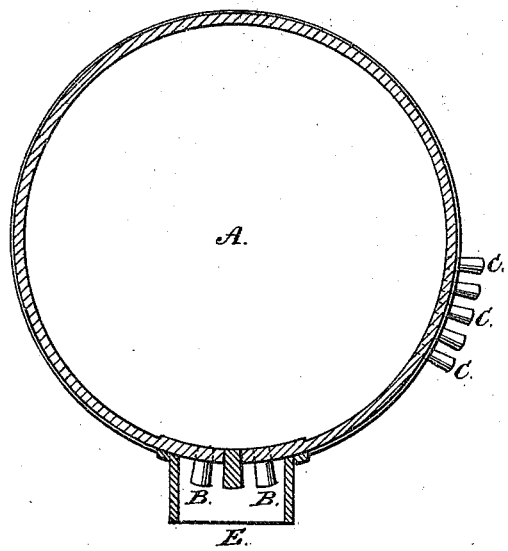
Figure 2:
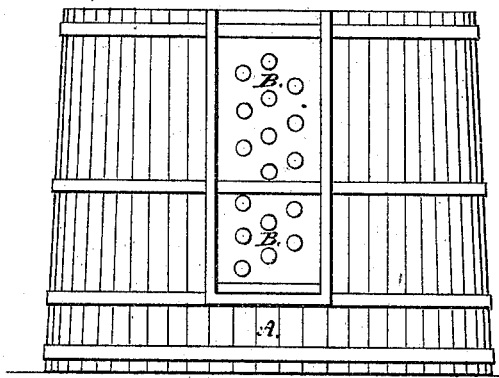
Figure 3:
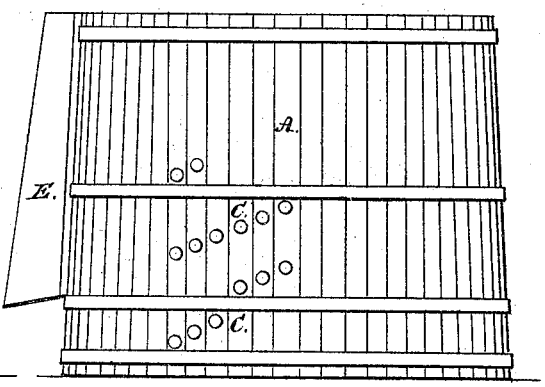

Figure 1 is a plan or top view of the apparatus. Fig. 2 is a front elevation. Fig. 3 is a side view of the same.

Similar letters of reference indicate corresponding parts in the several figures.

A is a tank or cistern to hold the liquor to be operated upon. This tank may be round, square, or any other form desired. B B are round plugs fitted into corresponding holes in the side of the tank. C C are also plugs, which are used to draw off the impure water when the starch and fiber have settled to the bottom of the tank. E is a spout for conveying the starch-liquor from the tank when plugs B B are taken out, as hereinafter described.

The nature of my invention consists of an improved apparatus which I use for the purpose of separating the starch from the fibrous matter and other impurities with which it is combined, after undergoing the usual process of maceration in alkaline solution.

I put a portion of the starch-liquor into the tank or cistern A, where it is allowed to remain at rest for a sufficient length of time for the starch and bran or fiber to settle to the bottom of the tank. All the liquor which does not contain starch is then drawn off by means of the plugs C in the side of the tank. The starch, bran, &c., which remain in the bottom of the tank are then mixed up thoroughly with abundance of pure water. I allow this liquor then to remain at rest till the matters other than starch begin to subside; and, as the impurities subside more rapidly than the starch, I draw off the liquor containing the pure starch by means of the plugs B and spout E into a reservoir provided for the purpose of receiving the same. In drawing off the starch-liquor, I begin near the top and proceed downward, drawing out one plug after another, keeping a short distance above the subsiding impurities. This process is repeated as often as may be necessary, in order to extract all the starch from the tank, leaving in the tank only the bran and other impurities. This part of the process of starch-making is known among starch-makers as "siphoning;" and other starch-makers draw the starch-liquor from the cistern or tank by means of a siphon.

By the use of my improved apparatus the operation can be performed much more rapidly and effectually than by the old method.

Having thus fully described my invention, what I claim, and desire to secure by Letters Patent, is—

The combination and arrangement, in a siphoning cistern or tank, of the plugs B and spout E, all constructed and operated in the manner and for the purpose specified.

The above specification of my said invention signed and witnessed at Oswego this 2d day of June, A. D. 1873.

THOMSON KINGSFORD.

Witnesses:
 H. C. MELNOTTE,
 GEO. HAYES BURT.